Jan. 17, 1928.
R. H. UHLEMANN
1,656,402
OPHTHALMIC MOUNTING
Filed March 1, 1926
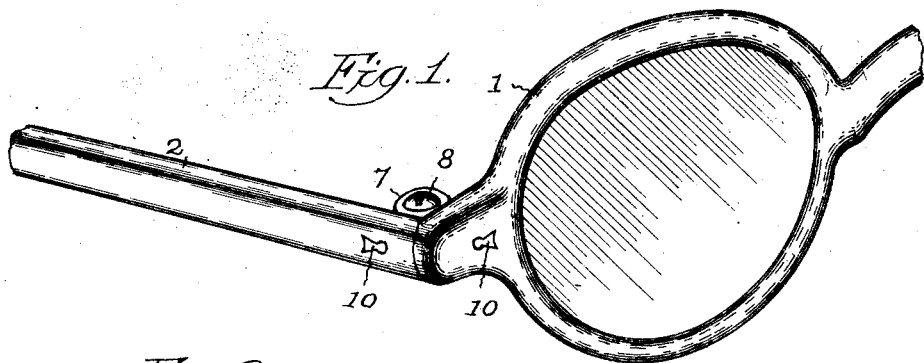
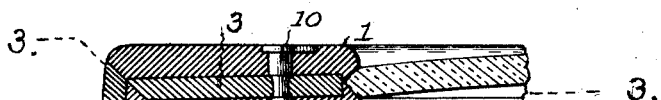
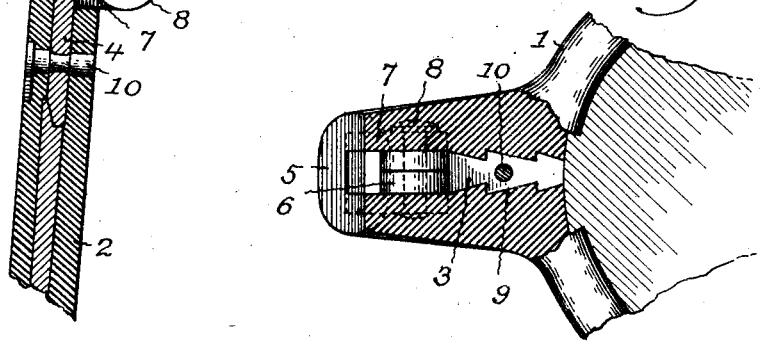
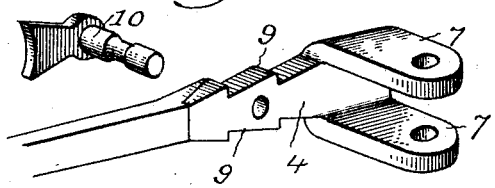
Inventor:
Richard H. Uhlemann,
by Robert Burns
Atty.

Patented Jan. 17, 1928.

1,656,402

UNITED STATES PATENT OFFICE.

RICHARD H. UHLEMANN, OF CHICAGO, ILLINOIS.

OPHTHALMIC MOUNTING.

Application filed March 1, 1926. Serial No. 91,423.

This invention relates more especially to hinge connections between the lens frames and temple bows of spectacles and like ophthalmic mountings in which said frames and bows are of a non-metallic material, and the present improvement has for its object:—

To provide a structural formation and combination of the members constituting the hinge connection between a lens frame and temple bow, which in addition to affording a substantial hinge connection is adapted to afford a like substantial attachment of said members to the lens frame and temple bow, in a manner wholly embedded therein and concealed from view, all as will hereinafter more fully appear.

In the accompanying drawing:

Fig. 1 is a detail perspective view of end portions of a non-metallic lens frame and a temple bow having the present improvement applied.

Fig. 2, is a detail horizontal section of the same.

Fig. 3, is a detail vertical section on line 3—3, Fig. 2.

Fig. 4, is a detail perspective view of one hinge member and its attaching rivet, in a separated condition.

Like reference numerals indicate like parts in the different views.

The lens frame 1 and the temple bow 2 are formed of any usual non-metallic material molded to form, and which in the present improvement are foldingly connected together by a hinge structure as follows:

A pair of approximately counterpart plate members 3 and 4, are formed with miter faces 5 at their adjoining ends so that contact between the same will insure proper angular relation between the lens frame 1 and temple bow 2 in actual use.

Adjacent to the miter ends 5, the plate members 3, 4, are provided with laterally extending and centrally orificed pivot lugs 6 and 7 adapted to interengage with their pivot orifices in aligned relation to receive the usual pivot pin or screw 8 by which the parts are operatively connected together.

In the present improvement the respective plate members formed with pluralities of teeth or serrations 9 of a triangular shape, with said serrations arranged in aligned relation at the opposite edges of the plate members 3 and 4, to afford wide portions between pairs of the serrations in which to form a receiving orifice for the central portion of the hereinafter described rivet without undue weaking of the prong member in which said orifice is formed. Such arrangement of the serrations 9, in addition, facilitates the introduction of a plate member into its receiving cavity in a frame 1 or a temple 2, with a minimum degree of displacement of the material of such receiving frame or temple in the operation of molding or compressing the material of the same onto the serrated plate member. In connection with the described serrated means of attachment, headed rivets 10 of ductile metal are passed through the material of the lens frame and temple bow and through orifices in the plate members 3 and 4, and in a final assembly of the parts said rivets are compressed longitudinally in order that they may expand laterally and attain a close and effective connection.

Having thus fully described my invention, what I claim and desire to secure by Letters Patent, is:—

1. In an ophthalmic mounting of the type described, a hinge connection for a lens frame and temple bow comprising, a pair of counter part plate members having near one end lateral lugs, a pivot screw connecting said lugs together in a pivotal manner, and ductile rivets passing through said plates and adjacent portions of the lens frame and temple bow for compression and expansion when in place to provide a central reduced portion engaging the orifice of a plate member, and enlarged cylindrical end portions fitting complementary orifices in the frame or temple.

2. In an ophthalmic mounting of the type described, a hinge connection for a lens frame and temple bow comprising a pair of counter part plate members having near one end lateral pivot lugs, and a pivot screw connecting said lugs together in a pivotal manner, the respective edges of a plate member having serrations of a triangular shape in transverse aligned relation and adapted for embedment in the material of a frame or temple, the plate member having a rivet receiving orifice between a pair of opposed serrations.

Signed at Chicago, Illinois this 28th day of February 1926.

RICHARD H. UHLEMANN.